(12) United States Patent
Soerensen et al.

(10) Patent No.: US 10,640,144 B2
(45) Date of Patent: May 5, 2020

(54) HYDRAULIC STEERING ARRANGEMENT

(71) Applicant: Danfoss Power Solutions ApS, Nordborg (DK)

(72) Inventors: Ole Soerensen, Nordborg (DK); Abdul Karim Rahimzai, Ames, IA (US)

(73) Assignee: Danfoss Power Solutions ApS, Nordborg (DK)

( * ) Notice: Subject to any disclaimer, the term of this patent is extended or adjusted under 35 U.S.C. 154(b) by 132 days.

(21) Appl. No.: 15/825,222

(22) Filed: Nov. 29, 2017

(65) Prior Publication Data

US 2018/0194393 A1    Jul. 12, 2018

(30) Foreign Application Priority Data

Jan. 6, 2017    (DE) .................. 10 2017 100 190

(51) Int. Cl.
| | |
|---|---|
| *B62D 5/08* | (2006.01) |
| *B62D 12/00* | (2006.01) |
| *F16K 27/04* | (2006.01) |
| *B62D 5/06* | (2006.01) |
| *B62D 5/20* | (2006.01) |

(52) U.S. Cl.
CPC .............. *B62D 5/08* (2013.01); *B62D 5/06* (2013.01); *B62D 5/062* (2013.01); *B62D 5/20* (2013.01); *B62D 12/00* (2013.01); *F16K 27/04* (2013.01)

(58) Field of Classification Search
CPC . B62D 5/08; B62D 5/06; B62D 5/062; B62D 5/20; B62D 12/00; B62D 5/093; B62D 5/097; G05D 16/107; F16K 27/04; F15B 2211/528; F15B 2211/55; F15B 2211/8613

USPC ..... 180/418, 421, 422; 137/514–514.7, 501; 251/48–55
See application file for complete search history.

(56) References Cited

U.S. PATENT DOCUMENTS

| | | | | | |
|---|---|---|---|---|---|
| 4,040,439 | A | * | 8/1977 | Uppal | F15B 13/02 137/115.14 |
| 5,845,737 | A | * | 12/1998 | Suzuki | B62D 5/083 180/441 |

(Continued)

FOREIGN PATENT DOCUMENTS

| | | |
|---|---|---|
| CN | 103465956 A | 12/2013 |
| CN | 105201944 A | 12/2015 |

(Continued)

OTHER PUBLICATIONS

First Examination Report for Indian Serial No. 201714036009 dated Oct. 23, 2019.

*Primary Examiner* — Anne Marie M Boehler
(74) *Attorney, Agent, or Firm* — McCormick, Paulding & Huber PLLC

(57) ABSTRACT

A hydraulic steering arrangement is shown having a steering unit and two working ports each of which being connected to the steering unit by a working line (3), wherein an anti jerk valve (9) is arranged in each working line (3), the anti jerk valve (9) having a valve element (12) being loaded in opening direction by the pressure in the working line (3) and in closing direction by restoring means (17). A vehicle equipped with such a steering arrangement should have a good comfort. To this end the valve element (12) is loaded in closing direction by the pressure in the working line (3) via delay means (21).

12 Claims, 1 Drawing Sheet

(56) References Cited

U.S. PATENT DOCUMENTS

| | | | | |
|---|---|---|---|---|
| 6,581,717 B1* | 6/2003 | Sorensen | ............... | B62D 5/09 |
| | | | | 180/401 |
| 6,655,492 B2* | 12/2003 | Juul | ............... | B62D 5/093 |
| | | | | 180/419 |
| 7,634,909 B1* | 12/2009 | Chatterjea | ............... | B62D 5/061 |
| | | | | 180/442 |
| 7,641,290 B2* | 1/2010 | Miller | ............... | F15B 21/044 |
| | | | | 180/441 |
| 8,020,660 B2* | 9/2011 | Kurata | ............... | B62D 5/062 |
| | | | | 180/417 |
| 9,038,762 B2* | 5/2015 | Vernersen | ............... | B62D 5/093 |
| | | | | 180/441 |
| 2002/0170769 A1* | 11/2002 | Sakaki | ............... | B62D 5/062 |
| | | | | 180/441 |
| 2007/0209859 A1* | 9/2007 | Miyajima | ............... | B62D 5/065 |
| | | | | 180/441 |
| 2009/0120085 A1* | 5/2009 | Yamaura | ............... | B62D 5/062 |
| | | | | 60/423 |
| 2015/0167555 A1* | 6/2015 | Mottet | ............... | F01D 25/20 |
| | | | | 60/39.08 |
| 2018/0156244 A1* | 6/2018 | Ma | ............... | F15B 21/14 |

FOREIGN PATENT DOCUMENTS

| | | |
|---|---|---|
| CN | 106143603 A | 11/2016 |
| DE | 19529455 A1 | 2/1997 |
| DE | 102004027971 A1 | 1/2005 |
| JP | 2000337306 A | 12/2000 |
| KR | 20120040684 A | 4/2012 |

* cited by examiner

HYDRAULIC STEERING ARRANGEMENT

CROSS-REFERENCE TO RELATED APPLICATION

This application claims foreign priority benefits under U.S.C. § 119 to German Patent Application No. 102017100190.5 filed on Jan. 6, 2017, the content of which is hereby incorporated by reference in its entirety.

TECHNICAL FIELD

The present invention relates to a hydraulic steering arrangement having a steering unit and two working ports each of which being connected to the steering unit by a working line, wherein an anti jerk valve is arranged in each working line, the anti jerk valve having a valve element being loaded in opening direction by a pressure in the working line and in closing direction by restoring means.

BACKGROUND ART

When such a hydraulic steering arrangement is used in for example large articulated steering systems, there can be an oscillation movement at the end of a steering operation. Such an oscillation movement is not very comfortable for the driver of the articulated steered vehicle since the driver's seat is located in or near the articulation axis. The oscillation is caused by the fact that at the end of the steering movement a large moving mass must be decelerated. This can be a problem when in the steering arrangement there is no path through which hydraulic fluid can escape.

SUMMARY

The problem underlying the invention is to make steering comfortable.

This object is solved with a hydraulic steering arrangement as described at the outset in that the valve element is loaded in closing direction by the pressure in the working line via delay means.

When in such a steering arrangement a sudden pressure increase occurs in one of the working lines the valve element is loaded in opening direction by the pressure in the working line. As the force generated by this pressure is larger than the force of the restoring means the valve element is moved in opening direction so that a certain amount of hydraulic fluid can escape to tank. After a time defined by the delay means the pressure increases on the other side of the valve element to finally arrive at the pressure of the pressure peak in the working line. This pressure moves back the valve element in the closing position. Without a pressure peak the valve element remains in closing position since the force generated by the static pressure in the working line together with the force of the restoring means is sufficient to keep the valve element in the closed position.

In an embodiment of the invention the valve element is arranged in a valve housing and the delay means are arranged in the valve housing as well. In this case there is no external piping necessary between the delay means and the valve housing.

In an embodiment the delay means are in form of an orifice. The orifice allows for a transfer of the pressure from the input to the output of the orifice. However, a pressure increase at the outlet of the orifice needs some time.

In an embodiment the orifice is arranged in a support wall supporting the restoring means. The support wall has two functions: a first function is to support the restoring means. The restoring means can be, for example, a spring which rests against the support wall. A second function of the support wall is to separate a pressure chamber directly connected to the working line from a pressure chamber in which the valve element is moveable.

In an embodiment the valve element has a first pressure area which is loaded by the pressure in the working line and a second pressure area which is loaded by the pressure at the outlet of the delay means wherein the second pressure area is larger than the first pressure area. In this way in a static condition without larger pressure peaks the valve element is firmly held in the closed position of the valve. When the same pressure acts on both sides of the valve element the pressure acting on the larger area generates a larger force.

In an embodiment of the invention the valve element in the region of the first pressure area is of conical form. The tip of the cone can be used to distribute the pressure over the first pressure area. However, in other embodiments, the valve element in the region of the first pressure area is different from a conical form.

In an embodiment of the invention the housing comprises an outlet opening and the valve element is slidably moveable over the outlet opening. In a closed condition the valve element covers the outlet opening and in the opened condition the valve element is shifted to release the outlet opening.

BRIEF DESCRIPTION OF THE DRAWINGS

An embodiment of the invention will now be described in more detail with reference to the drawing, wherein.

DETAILED DESCRIPTION

Figures 1, 2:
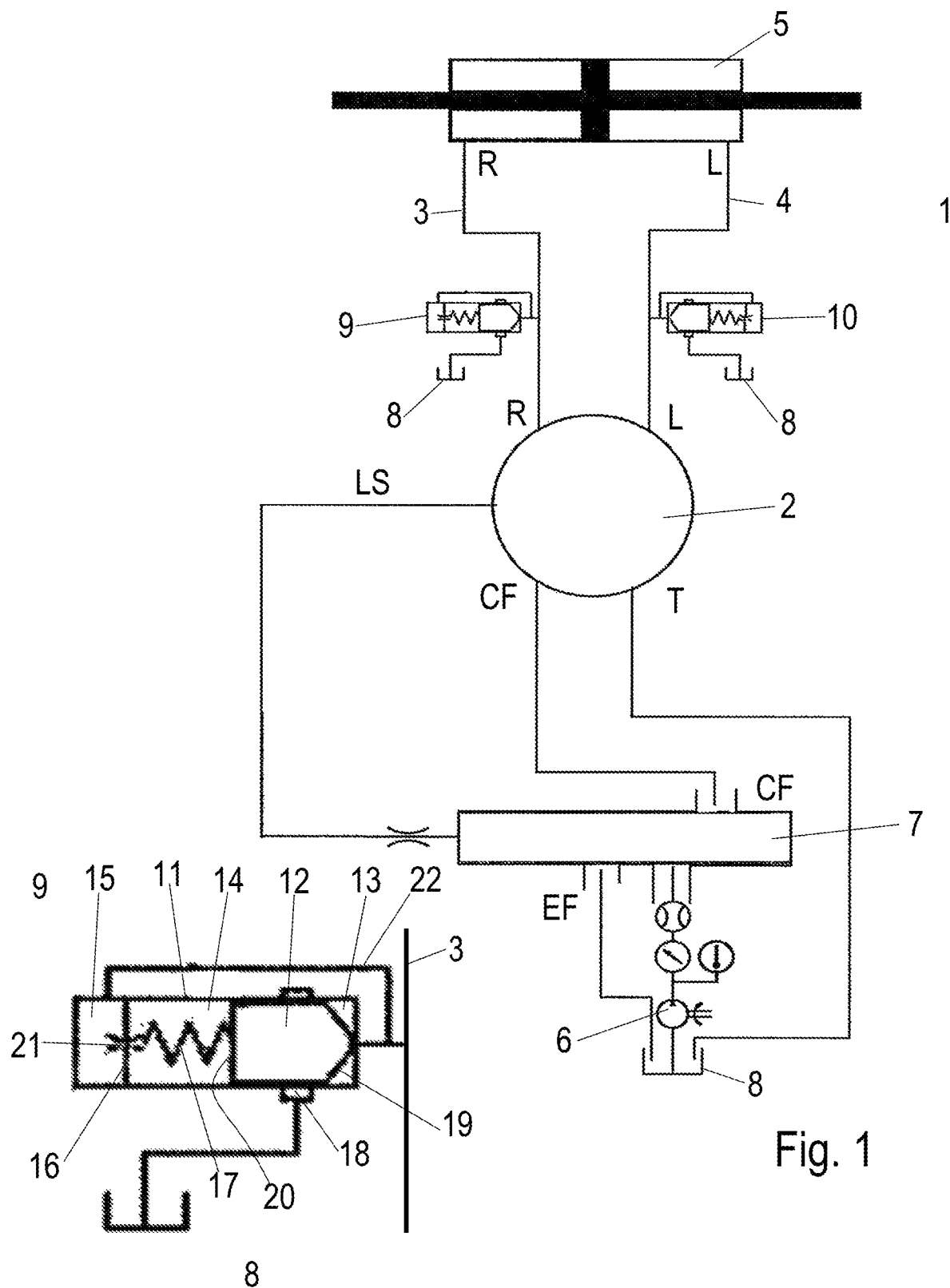
FIG. 1 is a schematic view of a steering arrangement and
FIG. 2 is an enlarged view of an anti jerk valve.

FIG. 1 schematically shows a steering arrangement 1 having a steering unit 2, for example an OSP produced by Danfoss Power Solutions, which is connected to a first working port R via a first working line and to a second working port L via a second working line 4. The two working ports R, L can be connected to a steering motor 5 which is schematically shown.

The steering unit 2 is connected to a pressure source which, in the present case, comprises a pump 6 and a priority valve 7. A load sensing line LS connects the steering unit 2 with the priority valve 7 as it is known in the art. It should be understood that this way of connection is just exemplaric. In some embodiments, the steering unit 2 is a static steering unit or a dynamic steering unit or a further type of steering unit.

The pump sucks hydraulic fluid out of a tank 8. The steering unit 2 delivers hydraulic fluid returning from the steering motor 5 to the tank 8 as well.

The function of the steering unit 2 is known per se. The steering unit 2 supplies upon rotation of a steering wheel or upon manipulation of another control element a certain amount of hydraulic fluid to the steering motor 5. When the steering motor has been moved or actuated by the desired steering angle a further supply of hydraulic fluid to the steering motor is interrupted. However, in large articulated steered vehicles this can lead to a problem that a large mass which has been moved during the steering operation has to be braked. Due to the inertia of the mass this leads to a sudden pressure increase in one of the two working lines 3, 4. Such a pressure increase can lead to unwanted oscillations which are in particular uncomfortable in an articulated steered vehicle since the seat of the driver is often located close to the articulation axis.

To overcome the problem of the oscillations, in the working line 3 an anti jerk valve 9 is arranged and in the working line 4 an anti jerk valve 10 is arranged. Both anti jerk valves 9, 10 are of the same construction and are identical. Therefore, only anti jerk valve 9 will be described in more detail.

Anti jerk valve 9 comprises a housing 11 in which a valve element 12 is slidably moveable. The housing 11 comprises a first pressure chamber 13 which is directly connected to the working line 3, a second pressure chamber 14 on the opposite side of the valve element 12 and a third pressure chamber 15 which is separated from the second pressure chamber 14 by a supporting wall 16. The valve element 12 is loaded by the force of a spring 17 which rests against the support wall 16 and forms part of restoring means pressing the valve element 12 in the position shown in FIG. 2. This position is named "closed position". The valve element 12 covers an outlet opening 18 of the housing 11 which is connected to tank 8. The outlet opening 18 can be in the form of a ring grove.

The valve element 12 has a first pressure area 19 in the first pressure chamber 13 and a second pressure area 20 in the second pressure chamber 14. The first pressure area 19 is smaller than the second pressure area 20.

The second pressure chamber 14 and the third pressure chamber 15 are connected by means of an orifice 21 which is arranged in the support wall 16 or forms part of the support wall 16. The orifice 21 forms a delay means.

The third pressure chamber 15 is directly connected to the working line 3.

In a static condition, i.e. without a sudden increase of the pressure in the working line 3 the pressures in the three pressure chambers 13, 14, 15 are equal. Since the second pressure area 20 is larger than the first pressure area 19 and in addition the spring 17 acts in the same direction as the pressure in the second pressure chamber 14 the valve element 12 is shifted into the closed condition shown in FIG. 2.

When a sudden pressure increase occurs in the working line 3 the pressure increases simultaneously in the first pressure chamber 13 and in the third pressure chamber 15. However, a corresponding pressure increase in the second pressure chamber 14 is delayed due to the orifice 21. If the force of the increased pressure in the first pressure chamber 13 acting on the first pressure area 19 exceeds the force generated by the still lower pressure in the second pressure chamber 14 plus the force of the spring 17, the valve element 12 is moved against the force of the spring 17 in an opening condition in which the valve element 12 opens the outlet opening 18 to let hydraulic fluid out of the first pressure chamber 13 escape to the tank 8.

The orifice 21 delays a pressure increase in the second pressure chamber 14. The delay time depends on the characteristics of the orifice 21 and can be adjusted in a certain range. Consequently, after the delay time the pressure in the second pressure chamber 14 has reached the increased pressure in the working line 3 and finally exceeds the pressure in the working line 3 since some hydraulic fluid has been released to tank 8. Consequently, the valve element 12 is shifted back to the closing position.

The delay time caused by the orifice 21 can be adapted to the oscillations of the vehicle equipped with the hydraulic steering arrangement shown in FIG. 1.

As shown in FIG. 2 the valve element 12 is of conical form in the region of the first pressure area 19. Pressure coming from the working line 3 is uniformly distributed over the first pressure area 19.

As will be understood, depending on an application and severity of the sudden pressure increase, the second pressure chamber 14 can be connected to the outlet opening 18 so that there is always a small amount of leakage in order to limit pressure build-up in the second pressure chamber 14 at times when the valve element 12 moves to the opened condition. The pressure drop created and thus a reduction of force on the second pressure area 20 can be compensated by changing the first pressure area 19 and/or the second pressure area 20.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement having a steering unit and two working ports each of which being connected to the steering unit by a working line, wherein an anti jerk valve is arranged in each working line, each anti jerk valve having a valve element being loaded in opening direction by a pressure in the working line connected to the respective anti jerk valve of the valve element and in closing direction by restoring means, wherein the valve element is loaded in closing direction by the pressure in the working line connected to the respective anti jerk valve of the valve element via delay means, wherein the valve element has a first pressure area which is loaded by the pressure in the working line and a second pressure area which is loaded by the pressure at an outlet of the delay means, wherein the second pressure area is larger than the first pressure area.

2. The steering arrangement according to claim 1, wherein the valve element is arranged in a valve housing and the delay means are arranged in the valve housing as well.

3. The steering arrangement according to claim 2, wherein the delay means are in form of an orifice.

4. The steering arrangement according to claim 1, wherein the delay means are in form of an orifice.

5. The steering arrangement according to claim 4, wherein the orifice is arranged in a support wall supporting the restoring means.

6. The steering arrangement according to claim 5, wherein the orifice is part of the support wall.

7. The steering arrangement according to claim 1, wherein the valve element in the region of the first pressure area is of conical form.

8. The steering arrangement according to claim 7, wherein the housing comprises an outlet opening and the valve element is slidably movable over the outlet opening.

9. A hydraulic steering arrangement having a steering unit and two working ports each of which being connected to the steering unit by a working line, wherein an anti jerk valve is arranged in each working line, each anti jerk valve having a valve element being loaded in opening direction by a pressure in the working line connected to the respective anti jerk valve of the valve element and in closing direction by restoring means, wherein the valve element is loaded in closing direction by the pressure in the working line connected to the respective anti jerk valve of the valve element via delay means;

wherein the delay means are in form of an orifice; and wherein the orifice is arranged in a support wall supporting the restoring means.

10. The hydraulic steering arrangement according to claim 9, wherein the valve element is arranged in a valve housing and the delay means are arranged in the valve housing as well.

11. The hydraulic steering arrangement according to claim 9, wherein the valve element in the region of the first pressure area is of conical form.

12. The hydraulic steering arrangement according to claim 9, wherein the housing comprises an outlet opening and the valve element is slidably movable over the outlet opening.

* * * * *